(12) United States Patent
Nelles et al.

(10) Patent No.: US 7,329,426 B2
(45) Date of Patent: Feb. 12, 2008

(54) TREATMENT OF VEGETABLE OILS OR ANIMAL FATS WITH SULFUR OR NITROGEN DONOR COMPOUNDS FOR ANIMAL FOOD FLAVORINGS

(75) Inventors: Lynn P. Nelles, Robins, IA (US); Mathias K. Sucan, Cincinnati, OH (US); Nayankumar B. Trivedi, Princeton, NJ (US)

(73) Assignee: Applied Food Biotechnology, Inc., O'Fallon, MO (US)

( * ) Notice: Subject to any disclaimer, the term of this patent is extended or adjusted under 35 U.S.C. 154(b) by 0 days.

(21) Appl. No.: 09/993,048

(22) Filed: Nov. 13, 2001

(65) Prior Publication Data

US 2003/0104102 A1 Jun. 5, 2003

(51) Int. Cl.
*A23L 1/22* (2006.01)
(52) U.S. Cl. .......................... 426/535; 426/2; 426/534; 426/601
(58) Field of Classification Search ................ 426/2, 426/534, 535, 536, 537, 601, 650
See application file for complete search history.

(56) References Cited

U.S. PATENT DOCUMENTS

| | | | |
|---|---|---|---|
| 4,267,195 A | 5/1981 | Boudreau et al. | |
| 4,282,254 A | 8/1981 | Franzen et al. | |
| 5,079,017 A * | 1/1992 | Chen et al. | 426/312 |
| 6,312,746 B2 | 11/2001 | Paluch | |
| 6,495,181 B1 * | 12/2002 | Farris et al. | 426/425 |

* cited by examiner

*Primary Examiner*—Leslie Wong
(74) *Attorney, Agent, or Firm*—Cantor Colburn LLP

(57) ABSTRACT

Oils or fats from plants and/or animals are chemically treated to create flavor/palatability enhancer (FPE) products for use with animal foods, such as dog or cat food. This method involves mixing triglycerides (from the oil or fat) with sulfur and/or nitrogen donor compounds, such as sodium sulfide. The mixture is cooked at a temperature close to boiling, or higher if pressure-cooking is used, for a period of time sufficient to break down large numbers of triglyceride molecules into their constituent fatty acids and other fragments. Under suitable cooking conditions, the organic fragments will react with sulfur and/or nitrogen atoms from the donor compound(s), to form relatively small organic molecules containing sulfur and/or nitrogen. These cooked products can be used as FPE's for pet foods for dry kibbles or biscuits, either alone, or mixed with a standard base compound such as a hydrolyzed liver digest. Two-bowl comparison tests indicate that these FPE's are effective, and they do not suffer from unpleasant odors that would disturb pet owners. This method can be used to process various types of fatty or oily wastes created by food-service or manufacturing operations, and because the cooking process will totally sterilize the ingredients, it can be used with contaminated, adulterated, or partially-spoiled food substances that are not adequately safe for human consumption.

13 Claims, 1 Drawing Sheet

TREATMENT OF VEGETABLE OILS OR ANIMAL FATS WITH SULFUR OR NITROGEN DONOR COMPOUNDS FOR ANIMAL FOOD FLAVORINGS

FIELD OF THE INVENTION

This invention is in the field of pet foods and pet food chemistry, and relates to methods of chemically treating animal fats and vegetable oils, to create products that can enhance the flavor and palatability of food products intended for companion animals such as dogs or cats.

BACKGROUND OF THE INVENTION

This invention is in the field of foods for "companion animals," such as dogs or cats. All references herein to food of any sort are intended to refer only to food that is manufactured and marketed for companion animals, such as dogs or cats. Although testing to date has focused on dogs, this invention can also be adapted for use with cats, pot-bellied pigs, ferrets, and similar classes of companion animals which generally are carnivorous or omnivorous.

If desired, the invention disclosed herein also can be tested to evaluated its suitability for use with still other classes of animals, including rodents (hamsters, guinea pigs, rabbits, etc.), birds, and reptiles, as well as for horses and any type of livestock. However, since dogs and cats show higher levels of sensitivity to taste and aroma than rodents, livestock, and most other classes of animals, and since dogs and cats form the largest categories (by far) of animals which receive flavor-enhanced animal foods, this text uses the term "pets", for convenience, to refer to any and all animals that are likely to receive the types of flavor-enhanced foods that are described herein. For convenience, a food product which is manufactured and marketed for animals, and which is likely to benefit from a flavor and/or palatability enhancer as disclosed herein, is referred to herein simply as a pet food, animal food, etc.

Pet foods are divided into several categories, because the packaging needs of the different categories differ substantially. At one end of the spectrum, high-moisture foods typically contain relatively high quantities of meat, and usually need to be packaged in cans, to prevent rapid degradation by bacteria, fungus, and other microbes.

In the middle of the moisture spectrum, pet foods with intermediate levels of moisture are often called soft dry, soft moist, semi-dry, or other comparable terms. These are not precise terms; instead, they indicate general categories that affect the type of handling and packaging that must be used for different formulations. In general, "soft dry" foods (usually with moisture content of about 12% up to about 20%) can be stored in bags made of heavy paper (or in cardboard boxes, canisters, etc.), without requiring a water-impermeable foil or plastic lining. "Soft-moist" foods (about 20% to about 40% moisture) can often be stored in a bag or box rather than a can, but the bag or box usually will require an impermeable foil or plastic lining.

At the low end of the moisture scale, "dry foods" (also called low-moisture foods) usually contain less than about 12 to 15% moisture, and usually produce a crunching sound when chewed by a pet. The particulate chunks in most dry foods are prepared from plant-derived materials, which provide protein, carbohydrates, fiber, and other bulk material.

Most dry pet foods, and many types of soft dry, soft moist, and semi-dry pet foods, are formed by pelleting or extrusion processes, which can provide high volumes at low cost. The term "kibbles" is used herein (and generally within the pet food industry) to refer to particulate chunks formed by either a pelleting or extrusion process. Typically, kibbles tend to have spherical, cylindrical, oval, or similar shapes, and they typically have a largest dimension of less than about 2 cm (about 1 inch).

By contrast, larger pet food items that are designed to be fed to a pet, one at a time, by the owner, to help promote or sustain a bonding process between a pet and its owner, are usually called biscuits or treats, within the pet food industry. Such items are referred to herein as "biscuits". They usually are formed by a process that involves molding, followed by baking or other cooking process to harden the dough, paste, or similar material that was molded. Pet food biscuits often contain (or are coated with) palatability-enhancing agents, in a manner comparable to the use of palatability-enhancing agents with kibbles; accordingly, although the discussion below refers mainly to kibbles, it should be understood that this invention is equally applicable to pet food biscuits and treats.

Similarly, although the examples and narrative below refer mainly to dry and semi-dry kibbles (since those types of foods pose the greatest challenge, with respect to making them appealing to dogs and cats), it should be understood that the palatability-enhancing agents disclosed herein can also be used with semi-moist or even canned pet foods.

Since dogs and cats generally prefer moist and meaty foods over chunks of dried plant material, kibbles (especially in low-moisture pet foods) usually must be coated by a powdered or liquid preparation that will provide the kibbles with a meaty, fishy, or other aroma and taste which appeals to dogs or cats. These types of coatings are often referred to as "palatability" enhancers, where "palatability" is an overall term that refers to the willingness of pets and test animals to eat a certain food and be satisfied by that food. Palatability includes all of the organoleptic (sensory) factors that affect the way a food is perceived by an animal; these factors includes aroma, taste, aftertaste, texture, "mouth feel", etc. Because "palatability" is an awkward polysyllabic word, the term "flavor-enhancer" is often used in its place, for convenience. Any references herein to "flavor-enhancing" or similar terms are used for convenience, and refer more precisely to "palatability-enhancing" traits. As is common in the industry, the term "flavor-palatability enhancing" is also used herein, since it can be referred to by the acronym "FPE".

As used herein, terms such as "flavor-enhancing" or "palatability-enhancing" also encompass traits that make a pet food appealing not just to pets, but to pet owners as well. Pet owners will not buy a pet food that has (for example) an aroma that humans consider offensive and disgusting, or which has such a high level of greasiness that it clings to an animal's mouth area and fur and poses problems of staining on carpets, furniture, etc.

Prior Art Flavor-Enhancers; Two-Bowl Tests

Extensive efforts have been made to develop various chemical additives and mixtures that will enhance the flavor (palatability) of non-canned foods for dogs and cats. Examples of such efforts are described in various texts, such as *Small Animal Clinical Nutrition,* 3rd edition (L. D. Lewis, M. L. Morris, and M. S. Hand, authors; published by Mark Morris Associates, Topeka, Kans., 1987), and in numerous U.S. patents, including U.S. Pat. Nos. 3,857,968 (Haas and Lugay 1974, covering a mixture of emulsified fat and protein, treated with lipase and protease enzymes and used as a spray coating); U.S. Pat. No. 3,930,031 (Kealy 1975, covering mixtures of phosphoric and citric acids); U.S. Pat. No. 4,089,978 (Lugay et al 1978, covering a mixture of sugar, animal blood, yeast, and fat, treated with lipase and protease enzymes); U.S. Pat. No. 4,160,038 (Groben et al 1979, covering mixtures of meat and vegetable proteins, fermented by bacteria that produce lactic acid); U.S. Pat. No. 4,191,781 (Schara et al, covering additives containing ammoniated glycyrrhizin); U.S. Pat. No. 4,211,797 (Cante et al 1980, on coatings made from lipolyzed beef); U.S. Pat. No. 4,267,195 (Boudreau et al 1981, covering various amino acids mixed with nucleoside phosphates); U.S. Pat. No. 4,282,254 (Franzen et al 1981, covering various amino acids); U.S. Pat. Nos. 4,391,829 and 4,393,085 (both by Spradlin et al 1983, covering digestion of grain products and meat products using both an amylase enzyme and a protease enzyme); and U.S. Pat. No. 4,784,860 (Christensen 1988, covering the treatment of vegetable protein with bacterial SPS-ase enzymes to convert polysaccharides into texture-enhancing components).

The effects of any proposed additive in an animal food can be measured by a test that is commonly called the "two-bowl consumption test", or simply "two-bowl test". In this type of test, a hungry animal is given a choice of two bowls, having two food preparations that are identical in their basic composition but which have different additives. The animal is allowed to select and eat the food it prefers, from the two choices.

For example, in tests using dogs, a dog in a pen or cage can be given equal amounts of food in Bowl A and Bowl B. Bowl A will contain a "control" food with a standard coating agent, and Bowl B will contain the same type of food, with the same standard coating agent, and with an added compound that is being tested as a palatability enhancer.

Depending on what types of comparisons are desired, the control food in Bowl A might be a standard extruded dry ("kibbles") base, which has been lightly coated with nothing but a standard coating agent that is used in nearly any dry food, such as poultry oil or beef tallow. However, testing a candidate FPE agent against a low-cost "basal" preparation is not a rigorous and convincing test, and will not indicate whether a candidate agent will be good enough to compete in the highly competitive market for dog and cat foods. Therefore, the control food in Bowl A preferably should be coated not just with a standard spray of poultry oil or beef tallow, but also with a known product that has fairly good FPE properties, such as a "liver digest" (a liquid which typically is formed by fermenting chicken, pork, or beef livers with hydrolytic bacteria). Testing a candidate FPE agent against a known FPE product such as a liver digest offers a more rigorous and revealing test of how good the candidate FPE agent really is.

The amount of food in Bowl A and Bowl B is weighed before the two bowls are offered to the dog. During the test, steps are taken to ensure that the dog does not finish the food in one bowl and then eat food from the other bowl because it is still hungry; this can be done by limiting the time of access to the bowls, and/or by providing enough food in either bowl to fully satisfy the dog.

After the dog has finished eating (or after the test period has ended), the two bowls are weighed again, to determine how much food was eaten from each bowl. The larger quantity is divided by the smaller quantity, to provide a ratio that is greater than 1.0. If more food was eaten from Bowl B (with the candidate flavor enhancer), the ratio is recorded as a positive value, to indicate that the palatability enhancer had a positive effect. If more food was eaten from Bowl A (the control food, without the candidate flavor enhancer), the ratio is recorded as a negative value, to indicate that the candidate flavor enhancer did not perform as well as the control food it was being tested against.

However, a negative ratio doesn't necessarily mean the candidate compound failed the test; for example, if an inexpensive flavoring agent (or a more expensive agent, at a low concentration) can come reasonably close to matching a very expensive premium flavor enhancer, the inexpensive or low-concentration agent might be regarded as being competitive and useful in pet foods. It also should be recognized that ratios of less than about 1.5 or 2 often do not indicate major differences in preference, and many food scientists commonly regard ratios less than about 1.5 or 2.0 as indicating that two preparations are roughly comparable.

By contrast, a good flavor enhancer will often generate consumption ratios that are higher than about 4 or 5, if compared to a basal food that has been coated with nothing more than poultry oil or beef tallow. Indeed, consumption ratios that approach infinity are not uncommon. In a two-bowl test, nearly all dogs or cats will sniff both bowls. If one bowl smells substantially better than the other, the animals will eat only from the bowl with the preferred fragrance, and consumption from the other bowl may be a flat zero.

When viewed by those standards, a low preference ratio (about 2 or less) indicates that two competing additives are nearly comparable. Test animals ate substantial quantities of both foods, and did not take just one or two bites from the less-preferred bowls and then eat the entire remainder of their food from the preferred bowls.

Two-bowl consumption tests were done on the compounds described below, using statistically significant numbers of animals (at least 10 animals in each test group), for at least two days in each test. For each test group, the total weight of the food eaten from the A and B bowls was added up, for all dogs in that test group. A ratio was then determined, based on those weight totals. The tests were done by independent testers, at kennels located away from the food manufacturing site, using number-coded foods so that the people who worked with the animals did not know which compound was present in any coded food preparation.

As described below, these tests evaluated a new class of flavor (palatability) enhancers in non-canned animal foods. The results indicated good results, when tested in dogs; the new class of flavor enhancers performed well, even when compared to premium flavor enhancers. Although tests have not yet been carried out in other types of pets, it is believed that these flavor enhancers are likely to perform well in many types of carnivorous animals (including cats, ferrets, pot-bellied pigs, etc.), and possibly in various types of herbivores as well.

Oils, Fats, and Triglycerides

Since the methods of this invention relate to chemical treatment of vegetable oils and/or animal fats, some background information on the chemistry of vegetable oils and animal fats should be taken into account.

Briefly, vegetable oils as well as animal fats both contain large quantities of molecules called "triglycerides". These molecules are also called "triacylglycerides", mainly by molecular biologists; the term "triglyceride" is no longer favored in molecular biology, but it is still the common term in the food industry.

Triglyceride molecules are formed when three fatty acid molecules react with a compound called glycerol. Glycerol is a short "poly-alcohol" molecule, with only three carbon atoms, each carbon atom having a single hydroxy group bonded to it, as follows:

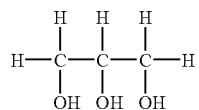

The types of fatty acids which are of interest herein (and in nature) are hydrocarbon molecules which have a carboxylic acid group at one end. A carboxylic acid group, R—COOH, readily releases its hydrogen proton, thereby forming the resulting anion, R—COO$^-$. When a carboxylic acid group on a fatty acid molecule reacts with one of the hydroxy groups on glycerol, the hydroxy group (from the glycerol) and the hydrogen proton (from the carboxylic acid group of the fatty acid) combine to form a water molecule, which is released. The type of covalent bond that is formed between the glycerol molecule and the fatty acid is generically called an ester bond; in an ester bond, a single carbon atom is double-bonded to a first oxygen atom which is not in the main chain, and single-bonded to a second carbon atom which is part of the main chain. Three ester bonds are present in the triglyceride molecule shown below.

Ester bonds are so frequent and so important in biochemistry that they are subdivided into various subcategories having their own names; accordingly, the type of ester bond that is formed between a glycerol molecule and a fatty acid molecule, in the type of biochemical reaction that creates fat, is called a glyceride bond.

If glycerol bonds to a single fatty acid molecule, the resulting molecule is called a mono-glyceride. If a single molecule of glycerol bonds with two fatty acid molecules, the result is called a di-glyceride. If all three of the hydroxy groups in a molecule of glycerol react with fatty acid molecules, the result is a tri-glyceride.

A typical triglyceride molecule can be shown as illustrated below, where each of the R1, R2, and R3 groups represents a hydrocarbon chain portion which is the residue of some particular fatty acid molecule:

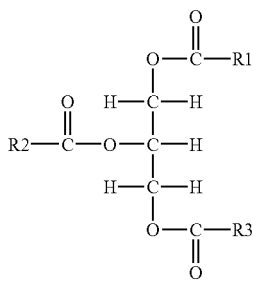

If all three of the fatty acids are identical, the triglyceride can be called a "simple" triglyceride; by contrast, if two or three different types of fatty acid residues are present, the triglyceride can be called a "mixed" triglyceride.

Triglyceride formation is a very important natural metabolic process in both plants and animals. In animals, triglycerides are the fundamental molecular building blocks of fat; as an animal accumulates fat, it does so by coupling fatty acid molecules to glycerol molecules, mainly forming triglycerides, with relatively small quantities of diglycerides and monoglycerides usually also present. The result is a chemical form of energy storage, which is very valuable in evolutionary terms, because the animal can conveniently store triglycerides (in fatty tissue) when food is plentiful, and can later break down its stored triglycerides, using that process to generate energy if food becomes scarce.

Only a relatively few plants form triglycerides in substantial quantities. However, because of the dietary and commercial usefulness of vegetable oils, a number of plants that synthesize and accumulate triglycerides (usually in the grain, nut, fruit, or other edible portion) have been identified and turned into crop plants. These crop species have been selectively bred (some for thousands of years) by farmers, plant scientists, and others, to create crop strains that generate relatively large quantities of triglycerides. Commercially important vegetable oils from these plants include corn oil, olive oil, safflower oil, peanut oil, palm oil, rapeseed oil, soybean oil, cottonseed oil, coconut oil, canola oil, etc. In general, it is conventional to refer to triglycerides extracted from plant sources as oils, rather than as fats.

The largest commercial sources of animal fat include beef fat (which includes beef tallow), pork fat (which includes pork lard), poultry fat (which can include chicken and/or turkey fat), and fish oils.

The particular types of fatty acid molecules created by different species of animals and plants vary substantially, in terms of molecular size. Most species of plants and animals that are of commercial interest create fatty acids with at least about 10 carbon atoms, up to about 25 carbon atoms and sometimes higher, in the "fatty" portion of the chain. Most fatty acids that are common in nature tend to have between 10 and 20 carbons; examples include lauric acid (10 carbons), palmitic acid (16 carbons), and stearic acid (18 carbons), all of which are saturated, as well as oleic, linoleic, and linolenic acid (all with 18 carbons, and with 1, 2, and 3 unsaturated bonds, respectively), and arachidonic acid (20 carbons, 4 unsaturated bonds).

At the very short end of the fatty acid range, fatty acids with fewer than about 10 carbon atoms tend to be thin (i.e, watery and non-viscous) and volatile, and are not as easy to handle or as commercially valuable as compounds that form oils which are stable and will not evaporate rapidly at normal room or handling temperatures. At the long end of the spectrum, fatty acids with more than about 25 carbon atoms tend to be heavier and thicker, and are often solid at room temperature; accordingly, they are present in beef tallow, pork lard, and other forms of fat that are solid at room temperature. They typically can be converted into liquified form merely by heating them to cooking temperatures.

Another important variation in the molecular structures of fatty acids synthesized by different animal and plant species involves unsaturated bonds. These occur when two adjacent carbon atoms, in a chain, are bonded to each other by a double-bond. Different species of plants and animals create varying different mixtures, ratios, and concentrations of unsaturated bond numbers and placements, in the complex mixture of fatty acids that an animal or plant synthesizes naturally.

For purposes of discussion herein, it is presumed that: (i) any higher animal or plant will synthesize a mixture of various different fatty acids; (ii) substantial variations will be present in the triglyceride mixture that is present in any single animal or plant; and, (iii) even larger variations will be present in the triglyceride mixture contained in a large batch of vegetable oil or animal fat that was prepared from numerous different plants or animals. These variations (in chain length, and in numbers and placements of unsaturated bonds) will show up in subtle differences in the carbon chains that are represented by the R1, R2, and R3 groups in a triglyceride, as illustrated above. Fortunately, these types of subtle differences in the fatty acid chains of triglyceride compounds do not impede the chemical treatment of such oil or fat preparations, using the methods disclosed herein, to create flavor/palatability enhancers for pet foods.

It is also presumed that in any large batch of vegetable oil or animal fat prepared from numerous plants or animals, substantial quantities of monoglycerides and diglycerides are also likely to be present. Fortunately, these compounds also do not interfere with the chemical treatment of oil or fat preparations using the methods disclosed herein, to create flavor/palatability enhancers for pet foods. Accordingly, when a vegetable oil or animal fat preparation is referred to herein as a triglyceride-containing preparation (or mixture, or similar substance), this is not meant to imply or suggest that the preparation, mixture, or substance contains only triglycerides. Instead, it merely indicates that the preparation, mixture, or substance contains large numbers of triglyceride molecules, in addition to any monoglycerides, diglycerides, lipids, proteins, carbohydrates, water, or other molecules that may be present. As used herein, the term "triglyceride" is simply a chemical term which includes the dominant components of both vegetable oil, and animal fat.

It also should be recognized that several types of chemical processing of oils and fats are well-known and widely used. One example is "saponification", which comes from the same root word as "soap". This term refers to treatment of a fat using a strong alkaline agent, such as caustic soda (also known as alkali, lye, sodium hydroxide, or NaOH). This treatment breaks apart the ester bonds that were formed when fatty acids became bonded to glycerol. This releases and/or regenerates the fatty acids (or modified versions thereof, such as their sodium salts).

Another important form of processing fats is called hydrogenation; in this process, a hydrogen-donating compound is used to convert the double bond(s) in an unsaturated carbon chain into single bonds, thereby creating a fully saturated carbon chain.

Still another well-known method of processing fats is called "rendering", which refers to cooking a fatty compound, usually by boiling the fatty compound with water present. This causes hydrolytic breakage of the ester bonds and/or carbon chains, in a manner which releases the fatty acids and/or smaller hydrocarbons.

Another type of processing involves enzymes, such as "lipase" enzymes, which typically cleave off fatty acids. Yet another form of processing uses metallic or crystalline compounds as catalysts; this is similar to the type of "catalytic cracking" that is used to break asphalt and heavy crude oils into smaller hydrocarbons that are valuable as gasoline, kerosene, or other fuels or lubricants.

Still another chemical name, "pyrolysis", has been given to the chemical reactions that occur when fat is heated to a sufficiently high temperature to cause it to brown, sear, etc. Pyrolysis occurs when an oily or fatty compound is fried or grilled, such as in a restaurant, or in a large-scale manufacturing facility which prepares certain types of cooked foods.

These forms of processing are of interest herein, because nearly all of them leave behind residues, including (in many cases) fatty residues which have foul and disgusting odors, and which must be disposed of as noxious and potentially toxic wastes. The methods of this invention may be useful for treating any particular such residue, to convert it into a valuable product; this can be evaluated on a case-by-case basis, using the unwanted residue from any such known process that is used to commercially treat any fatty or oily preparation.

Accordingly, one object of this invention is to disclose a new class of flavor/palatability enhancers, for foods that are manufactured and marketed for companion animals such as dogs or cats, which can be made by using vegetable oil and/or animal fat as a major starting ingredient.

Another object of the subject invention is to provide a new type of flavor enhancer, for use as a low-volume coating on pelleted or extruded kibbles or molded biscuits, for pets.

Another object of this invention is to disclose a new class of flavor/palatability enhancers, which can be coated onto the surfaces of dry or semi-dry foods for pets.

Another object of this invention is to disclose a method of chemically treating the residues that are created by treating fatty or oily compounds using a process such as saponification, rendering, enzymatic digestion, catalytic refining, etc., to render those residues commercially useful and valuable.

These and other objects of the invention will become more apparent through the following summary, drawings, and description of the preferred embodiments.

SUMMARY OF THE INVENTION

A method is disclosed for chemically treating an oil or fat preparation derived from one or more plant and/or animal sources to render the resulting product useful as a flavor and palatability enhancer (FPE) product, for use as an additive or coating agent for one or more types of pet foods. This method involves creating a liquified mixture containing triglycerides (from the oil or fat source) and one or more sulfur and/or nitrogen donor compounds. The mixture of oil and/or fat combined with the nitrogen and/or sulfur donor compound(s) is cooked at a suitable temperature (such as temperatures close to boiling, or temperatures in the range of about 150 to 250° C. if elevated pressure is used) for a period of time sufficient to break down large numbers of triglyceride molecules into their constituent fatty acids, and other smaller fragments. Under suitable cooking conditions, the freshly-lysed fragments will react with sulfur and/or nitrogen atoms from the donor compound(s), thereby forming sulfurous and/or nitrogenous compounds with molecular weights that are generally substantially lower than the molecular weights of conventional triglycerides. The resulting mixtures, and/or sulfurous and/or nitrogenous extracts from these mixtures, can be used as flavor/palatability enhancers for pet foods, including low-moisture kibbles. Two-bowl consumption tests indicate that these sulfurous and/or nitrogenous derived from plant oils or animal fats can provide effective and high-quality yet economical flavor/palatability enhancers.

DESCRIPTION OF THE PREFERRED EMBODIMENTS

Figure 1:
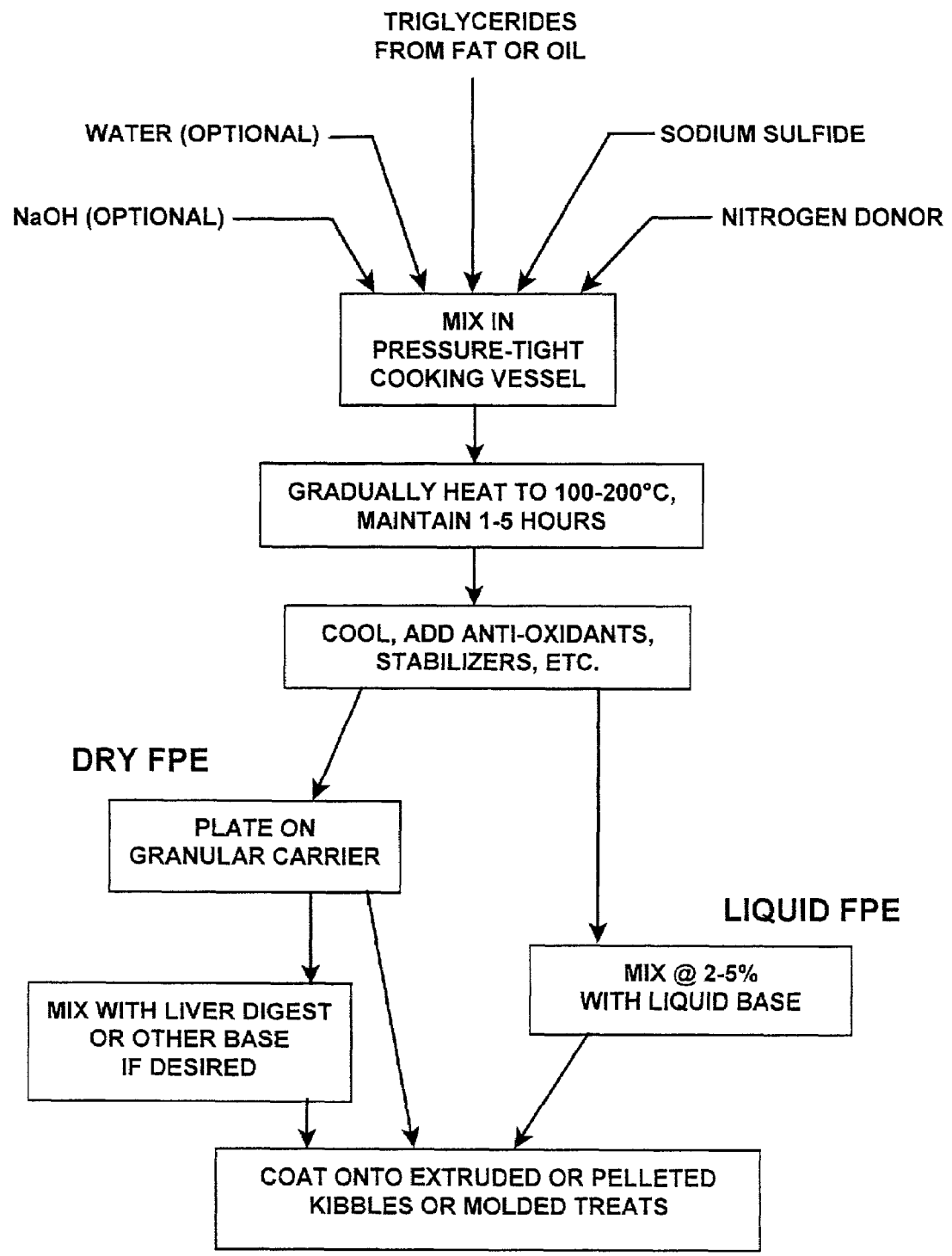
FIG. 1 is a flowchart depicting the major steps in a preferred method of (i) cooking a vegetable oil or animal fat preparation with sulfur and nitrogen donor compounds, and (ii) creating a flavor/palatability enhancer (FPE) compound or mixture, from the product of the cooking reaction. The alternate pathways shown in the lower half of the flowchart depict ways of creating a liquid FPE, or a dry FPE.

As indicated in the Summary, the method of this invention involves heating a vegetable oil or animal fat, which has been mixed with one or more sulfur and/or nitrogen donor compounds, under time and temperature conditions (under elevated pressure, if desired) which cause the breakdown of triglycerides into constituent fatty acids and/or other smaller molecules, including fragments of fatty acids. At least some of the smaller molecules created by this cooking process will react with sulfur and/or nitrogen atoms provided by the donor compound(s), to form relatively small molecules containing sulfur and/or nitrogen.

In order to be covered by this invention, the product which results from a cooking step as disclosed herein must be "a cooked product for use as a palatability enhancer for at least one type of animal food preparation." The term "palatability enhancer" indicates and requires that the cooked product must be recognized and must have been demonstrated as providing a significant increase in palatability, for at least one type of animal food (preferably including at least one type of extruded, pelleted, or molded animal food), when tested on at least one type of animal (such as dogs, cats, etc.) using properly-run comparative tests, such as conventional two-bowl tests, and when compared against a suitable and well-known comparative substance (such as, for example, a liver digest or other "base" mixture which does not contain additional palatability-enhancing additives).

The limitation which requires that the product must be suited "for use as a palatability enhancer for at least one type of animal food preparation" implies that the product of the cooking reaction (after mixing, if desired, with a suitable "base", such as a liver digest, to form a complete and finalized palatability enhancing product) must be treated and handled in a manner in which palatability enhancers are handled, in the animal food industry. Such methods of treatment include, for example, packaging a cooked product for shipment to a pet food manufacturer, coating it onto extruded, pelleted, molded or other particulate or shaped animal foods, mixing it with a dough, paste, or other preparation during the manufacture of an animal food, etc.

This claim limitation is intended to address and avoid the fact that animal fats and vegetable oils have been cooked in a huge variety of ways, with compounds that may have served to some extent as sulfur and/or nitrogen donors. Indeed, since any cell-containing preparation necessarily contains at least some sulfur and at least some nitrogen, any preparation which contains microbial cells might be referred to as a sulfur and/or nitrogen donor, and any such cooking process might arguably be deemed to comprise prior art.

However, this invention is not intended to relate to, read upon, or restrict in any way any such prior art or prior usage, if the product of such cooking procedure was not in fact used as a palatability enhancer in a commercial-scale manufacturing operation used to create animal foods in bulk. Instead, this invention is limited strictly to commercial-scale preparation of cooked products which are in fact used as palatability enhancers for animal foods; accordingly, such products must be packaged for shipment to a pet food manufacturer or comparable company, coated onto or mixed with an animal food intermediate, or otherwise handled in a manner in which palatability enhancers are conventionally handled in the animal food industry. This type of handling and use is encompassed within the phrase, "a cooked product for use as a palatability enhancer for at least one type of animal food preparation".

In addition, it should be recognized that the phrase, "a cooked product for use as a palatability enhancer for at least one type of animal food preparation" also implies and requires that the cooked product must indeed provide a substantial improvement in palatability, when measured by properly-run two-bowl or other suitable tests, to justify the manufacture or purchase of the palatability enhancer, in commercial quantities, by an animal food manufacturer. As a general guideline, to meet that performance requirement, cooked products as disclosed herein should provide an increase of at least about 1.5× or greater, and preferably about 2× or greater, when mixed with a conventional "base" additive (such as a liver digest) and then compared to the performance of the base additive by itself, when both preparations are coated onto identical dry kibbles and compared in a two-bowl test.

Similarly, it should be recognized that the claims separate microbial cell donor substances, and "non-cellular" donor compounds, into separate categories, in order to further reduce any chance of unintended encroachment on unrelated prior art and non-covered commercial processes. "Non-cellular" sulfur and/or nitrogen donor compounds are generally regarded as including chemical reagents that do not include large quantities of cells or cell residues. Examples of non-cellular sulfur donors include sodium sulfide, sulfide salts, sulfide "liquors" (including so-called "steep liquors" such as corn steep liquor), and elemental sulfur; other potential sulfur donor compounds which can be evaluated, to determine whether they can be used effectively and economically, include amino acid or short peptide preparations that contain sulfur, and manufacturing byproducts that contain sulfur. Examples of non-cellular nitrogen donors include amino acids, nucleotides, urea, other molecules that contain amine, amide, or guanidino groups, heterocyclic compounds that can readily release and donate nitrogen atoms under cooking conditions, and manufacturing byproducts that contain at least about 5% nitrogen by weight. The term "manufacturing" is used broadly herein, and includes operations that are carried out incident to the making, fermenting, conversion, purification, extraction, or other processing of some valuable end product or intermediate, and can include incidental or ancillary operations such as clean-up, remediation, or detoxification of substances such as byproducts or wastes generated by a manufacturing operation.

As used herein, terms such as "microbial cells", "microbial cell-containing substance", and "microbial cellular substance", refer to a sulfur and/or nitrogen donor substance which contains a substantial quantity (such as at least roughly 15%, by weight) of cells or cell fragments from microbes (bacteria, yeast, fungi, etc.). Such microbial cell substances may contain whole viable cells, whole killed cells, preparations containing lysed, ruptured, or otherwise processed cell fragments, cell fragments that remain after an extraction process has been carried out to recover a fermentation product, etc., alone or in any combination. In general, to be suitable and efficient for use as a nitrogen donor substance as disclosed herein, a microbial cell substance should contain at least about 10% and preferably at least about 15% nitrogen, as a fraction of its dry weight. Preferred microbial cell candidates for evaluation as described herein will most commonly also include more than the normal concentration of sulfur that occurs in nearly all cells; for example, preferred candidates for evaluation as disclosed herein include microbial cell types that are used in manufacturing processes that directly involve sulfur, such as cells used to process corn or other grain in a manner that generates so-called "steep liquor".

If desired, a non-cellular donor substance and a cellular donor substance can be mixed together, and used as a cooking ingredient as disclosed herein. For example, if desired, a mixture which contains both a steep liquor, and microbial cells used to generate the steep liquor, can be evaluated for use as disclosed herein. In this type of mixture, the microbial cells would function as the primary donor of nitrogen atoms, and the steep liquor would function as the primary donor of sulfur atoms.

The major steps in a preferred embodiment of the mixing and cooking procedure disclosed herein are depicted in flowchart form, in FIG. 1. With respect to the ingredients indicated near the top of that flowchart, three things should be noted. First, water will be required, if caustic (NaOH) is used to saponify the fat (i.e., to break apart the ester bonds that were formed when fatty acids became bonded to glycerol molecules, during the formation of the triglycerides). However, if saponification is not used, and if the mixing and cooking conditions are controlled so that the cooking process will primarily break off fragments of the fatty acids without necessarily breaking the ester bonds, water may not be required in the mixture.

Second, as described in more detail elsewhere, it is not necessary to use sodium sulfide as the sulfur donor compound; however, sodium sulfide provides a highly effective and relatively inexpensive ingredient which is not difficult to work with, so it is a preferred ingredient, and was used as the sulfur donor in all tests described in the Examples.

And third, although providing at least one sulfur donor or nitrogen donor compound is necessary in this invention, it is not necessary to provide both. As indicated in Examples 3 and 4 below, tests using a sulfur donor but not a nitrogen donor provided highly positive results. Although tests have not been carried out to date using a nitrogen donor without a sulfur donor, it is believed and expected that such steps could generate a product which provides at least some benefit as an FPE compound when used with at least some types of dry or semi-dry pet food products.

Returning to the flowchart, it is not essential that the initial ingredients must be loaded into a pressure-tight vessel, since the same general results can be obtained by cooking the reagents at atmospheric pressure. However, any such process is likely to require a substantially longer cooking time. Accordingly, in commercial-scale manufacturing operations, the economic benefits of using pressure cooking, to reduce cooking times and energy requirements, are formidable.

Various claims include the phrase, "creating a liquified mixture comprising triglyceride molecules . . . " It should be recognized that this step can be carried out by using a fatty substance which is initially solid (such as lard or tallow), and heating the fatty substance until it becomes liquified. As illustrative examples, in each of the examples below, the various ingredients were all mixed together and then gradually heated, from initial room or refrigerated temperatures to cooking temperatures, over a span of 45 minutes or more. This was deliberately intended to help ensure that the fatty or oily mixture had reached a thoroughly liquified state, by the time it reached its cooking temperature. This also helped prevent and reduce searing, pyrolysis, and other localized forms of burning, which can lead to inconsistencies and inhomogeneities in a cooked product.

If the intended final product is going to be a flavor and/or palatability enhancer (referred to below as an FPE) in liquid form, the product of the cooking reaction, in most cases, will be stirred into another liquid preparation, generically referred to as a "liquid base". Typical liquid base mixtures can be created by, for example, using hydrolytic microbes or enzymes to digest a suitable type of animal byproduct (such as, for example, a liver digest, prepared from chicken, beef, or pork livers), in a manner which turns the meaty byproduct into a liquid, slurry, or similar liquified preparation. Alternately, a liquid base can be prepared from hydrolyzed vegetable proteins.

In one embodiment, a palatability enhancer for an animal food comprises a mixture of (a) the product of the cooking reaction, and (b) at least one second palatability enhancer ingredient. The at least one second palatability enhancer ingredient is prepared, for example, by hydrolytic fermentation of at least one type of cohesive animal tissue.

The palatability enhancer for an animal food may comprise a second palatability enhancer in addition to the palatability enhancer formed by the disclosed methods. The second palatability enhancer may be prepared by hydrolytic fermentation of at least one type of cohesive animal tissue such as, for example, chicken livers.

If the intended final product is going to be an FPE in dry form, the product of the cooking reaction can be treated by any of several means. One such means is often referred to as "plating", in which a relatively small quantity of the treated fatty liquid (such as about 5 to about 20%, by weight) is thoroughly mixed with a powdered or granular substance, such as corn flour, corn starch, etc. The fatty liquid coats the surfaces of the powder or grains, and if sufficient mixing is carried out, the resulting mixture remains in a granular form, which can be subsequently handled as a dry FPE preparation. This type of dry FPE can be mixed with a liquid base (such as a liver digest, as discussed above) and then coated onto kibbles or biscuits; alternately, the dry FPE can be coated directly onto kibbles or biscuits.

FPE preparations as disclosed herein can be used as "additives" with, in, or on the surfaces of, animal foods, such as kibbles or biscuits intended for cats, dogs, ferrets, pot-bellied pigs, etc. The term "additive" is used broadly herein, to include (for example): (i) FPE preparations that are coated onto the surfaces of pre-formed kibbles, biscuits, treats, or other food preparations, and (ii) FPE preparations that are added to, and presumably but not necessarily mixed in with, a dough, paste, slurry, meat-containing preparation, or other solid, semi-solid, or semi-liquid food reagent, prior to cooking or other processing or packaging of the foodstuff.

The term "animal food intermediate" is used broadly herein, and refers to any "non-final" product: (i) that is created during a manufacturing process used to create a food for dogs, cats, or other animals, and (ii) to which an FPE additive, as disclosed herein, is added. For example, coating an FPE liquid or powder onto the surfaces of kibbles or biscuits is regarded as adding the FPE liquid or powder to an animal food intermediate (i.e., to unflavored and therefore unfinished kibbles or biscuits). Similarly, mixing an FPE liquid or powder with a dough, paste, slurry, or cooked or uncooked meaty preparation would also be regarded as adding the FPE liquid or powder to an animal food intermediate.

Any commercially available source of vegetable oil and/or animal fat, and any mixture of vegetable oils and/or animal fats that may be of interest, can be tested to determine whether it is (or they are) suitable for processing and use as disclosed herein, using no more than routine experimentation. Potential sources of plant oils which are available in large quantities include corn oil, olive oil, safflower oil, peanut oil, palm oil, rapeseed oil, soybean oil, cottonseed oil, coconut oil, canola oil, etc. Potential sources of animal fats that are available in large quantities include beef fat, pork fat, poultry fat, and fish oils.

Potential sources of oil or fat triglycerides for use as disclosed herein also include by-products of manufacturing processes, including (by way of example, and not limitation): (i) processes used to manufacture foods for humans; and, (ii) processes which generate fatty or oily residues following a rendering, enzymatic, saponification, cooking, or other food treatment, purification, or preparation process.

Potential sources of triglycerides for use herein also include oily or fatty substances that do not meet one or more quality or safety standards that apply to foods being prepared for human use, due to adulteration, contamination, spoilage, improper color or clarity, or any other factor deemed important to a manufacturer or purchaser (bearing in mind that food safety is crucially important, and ingredients which are suspicious in any way often must be rejected). With respect to using adulterated, contaminated, partially-spoiled, or otherwise unsafe or rejected products or byproducts of manufacturing or other processes used to create foods for humans, the cooking processes described herein will sterilize, in a highly reliable manner, any contaminated, spoiled, or otherwise unsafe or uncertain source of triglycerides that cannot be used safely in human foods.

Triglyceride preparations derived from any of the above-listed plant or animal sources (or from any combination thereof), or from any other source of animal or plant triglycerides, can be tested with any selected type or combination of sulfur and/or nitrogen donor compound(s) as described herein, using no more than routine experimentation, to evaluate whether any such combination of ingredients or reagents can be cooked together, as disclosed herein, to provide a good FPE preparation that can be used as a coating agent or other additive in one or more types of animal foods.

Various types of sulfur-donating reagents can be used during the cooking processes disclosed herein. Such reagents include sulfide salts, such as sodium sulfide, potassium sulfide, calcium sulfide, etc. In general, sulfide salts (especially sodium sulfide) are the most inexpensive and economical sulfur donating reagents; they also tend to be highly effective sulfur donors, and they are not difficult to work with. For these reasons, they are generally preferred, and sodium sulfide was used as the sulfur-donating reagent in all test preparations described in the Examples below.

If desired, elemental sulfur can be evaluated for use as disclosed herein, with any particular type, source, or mixture of vegetable oil and/or animal fat.

In addition, various other types of sulfur-containing molecules can also be evaluated for use as disclosed herein, and such reagents may be economically feasible and desirable, if a supply of such reagent is available as an inexpensive and/or troublesome byproduct of a manufacturing process. For example, "sulfide liquors" are generated by various types of manufacturing processes, including paper-making, molasses manufacturing, and processing of corn and certain other types of grain. Similarly, certain types of yeast and other microbes are used to help degrade and break down sulfide liquor wastes from paper-making and other operations. If such microbes are available inexpensively (for example, if they would otherwise generate a solid waste disposal problem for the manufacturing company which generated them), they can be tested (presumably in a form such as lysed cells) and evaluated, to determine whether they can provide a suitable and useful sulfur-donating material for treating a triglyceride preparation, as described herein.

Similarly, any other type of manufacturing byproduct that contains sulfur can be evaluated for potential use as a sulfur-donating compound as described herein, using no more than routine experimentation. Preferred candidates generally should contain at least about 1% sulfur (by weight), and should be available inexpensively (for example, because it would otherwise need to be disposed of as an unwanted waste product).

Various types of nitrogen-donating compounds that do not (or may not) contain sulfur can be evaluated for possible use as described herein, using no more than routine experimentation. As one example, since nitrogen is an essential component of DNA, RNA, and protein, microbes such as yeast typically contain about 10 to about 13% nitrogen as a portion of their dry weight, and some types of food-grade bacteria are known to have even higher concentrations of nitrogen. Such cells can be added to the cooking mixture in the form of lysed cell preparations, or as whole cells which will be lysed by the cooking temperatures and pressures disclosed herein, or as extracts, residues, or byproducts from other manufacturing operations.

Similarly, every amino acid contains nitrogen in its peptide-forming portion, and out of the twenty primary amino acids, five (arginine, histidine, lysine, asparagine, and glutamine) also have nitrogen atoms in their pendant portions as well. Urea, nucleotides, and various molecules that contain amine, amide, or "guanidino" groups, may also serve as nitrogen donors, as can be evaluated using routine experimentation. In addition, various types of heterocyclic compounds might be useful as nitrogen donor compounds, provided that they can release and donate their nitrogen atoms without prohibitively high cooking costs.

In addition, any type of manufacturing byproduct that contains nitrogen as a substantial component can also be evaluated for potential use as a sulfur-donating compound as described herein, using no more than routine experimentation. Preferred compounds of this nature typically will contain at least about 5% nitrogen (by weight) in the form of amines or amides, and in many cases may otherwise need to be disposed of as unwanted and possibly even hazardous wastes.

Any type of compound which contains both sulfur and nitrogen can also be evaluated for use as disclosed herein, with any particular type, source, or mixture of vegetable oil and/or animal fat. Candidate sources include, for example: (i) cysteine and/or methionine, the two "primary" amino acids that contain sulfur; (ii) various other natural but "non-primary" amino acids that contain sulfur, such as homocysteine and cystathionine; and (iii) short peptides, such as glutathione and homoglutathione, which are present at relatively high concentrations in liver tissue. Ammonium sulfide and other nitrogenous sulfide or sulfate chemicals may also be useful, if the odor problems inherent in using the candidate chemical can be adequately controlled in the final product after it has been cooked.

Suitable cooking processes will generally fall into either of two categories, depending on whether elevated pressures are used or not.

If elevated pressures are not used, suitable and economical cooking temperatures which can induce and sustain the chemical reactions described herein typically will be in a range slightly below boiling temperatures, such as a range of about 90 to about 98 degrees centigrade. In this type of processing, the use of a reflux vessel (i.e., a device which uses cooled or ambient condensation surfaces placed above the surface of the heated liquid, in a manner designed to cause any liquid condensate which collects on the cooled or ambient surfaces to be returned to the liquid being cooked) can substantially reduce losses through evaporation. If reflux vessels are used, suitable cooking times typically will be within a range of about 1 hour to about 6 hours, at temperatures ranging from about 90 to about 98° C.

In commercial-scale manufacturing operations, pressurized cooking is likely to be preferred for the processing disclosed herein, since pressure allows the use of substantially shorter cooking times; this substantially reduces fuel requirements, and makes more efficient use of any large cooking vessels. If pressurized cooking is used, temperatures in the range of about 110 to about 200° C. can be used. Full-temperature cooking periods that typically will be in the range of about 15 to about 60 minutes can be used; if desired, these can be preceded and followed by somewhat extended "ramp-up" and "ramp-down" periods, which typically will be about 10 to about 70 minutes each, at the beginning and end of the cooking period.

The pressure inside a pressurized cooking chamber can be controlled by a valve, which in vessels used for commercial operations typically can be set to any desired value. Cooking pressures used in such operations typically range from about 10 psig (i.e., pounds per square inch as measured in "gauge" pressure, which indicates how much the pressure inside the closed vessel exceeds the ambient atmospheric pressure in the room where the vessel is located) up to much higher pressures (which will be limited by several factors, including the strength of the vessel, the setting of the safety valve that protects the vessel, and the temperature, composition, and vapor pressure of the liquid inside the closed vessel).

In the tests described in the Examples below, a pressure cooking system called a "Parr vessel" was used. This is the common name for a commercially available system that is widely used in laboratories. Among other advantages, it uses high-strength metals that will not corrode (mainly stainless steel), a programmable microprocessor control system, and heating and cooling components that are distributed around the entire cooking chamber. These features ensure consistent, uniform, and easily controlled temperatures, timing, and pressures, and these factors in turn help ensure greater reproducibility and reliability, in any tests and test results.

EXAMPLES

Example 1

Treatment of Anhydrous Butter Oil with Sulfide

The following ingredients were mixed together and placed in a Parr reaction vessel:

| | |
|---|---|
| sodium sulfide, 25% w/w in water | 50 g |
| anhydrous butter oil | 300 g |
| aqueous solution, 50% sodium hydroxide | 45 g |
| water | 460 g |
| Pekins Yeast slurry (40% solids) | 140 g |

The cooking temperature was gradually increased to 200° C. over 70 minutes, held at 200° C. for 50 minutes, and gradually decreased to 50° C. over 60 minutes. Five grams of "Phaulox-P" antioxidant were added. The resulting mixture was added, at quantities ranging from 2.5% to 10% by weight, to a standard liquid palatability enhancing preparation, which had previously been prepared by using hydrolytic enzymes to digest chicken livers.

Based on two-bowl tests using dogs, this butter oil preparation improved the palatability of the standard liquid liver digest by 2-3×, compared to the same liver digest with no additives.

Example 2

Treatment of Poultry Fat with Sulfide and Ammonium

The following ingredients were mixed together and placed in a Parr vessel:

| | |
|---|---|
| Poultry fat | 338.2 g |
| Water | 531.9 g |
| Sodium hydroxide (granular) | 71.2 g |
| Sodium sulfide (granular) | 25 g |
| Ammonium hydroxide | 12.5 g |

The cooking temperature was gradually increased to 140° C. over 45 minutes, held at 140° C. for 60 minutes, and gradually decreased to 50° C. over 30 minutes. A mixture containing 0.2 g tocopherol as an antioxidant and 21 g Tween-80 as a surfactant was added. The resulting mixture was added, at 5% by weight, to the same type of standard chicken liver liquid digest described in Example 1.

Based on two-bowl tests using dogs, this poultry fat preparation improved the palatability of the liver digest by 2-3×, compared to the same liver digest with no additives.

Example 3

Treatment of Chicken Fat with Sulfide

The following ingredients were mixed together and placed in a Parr vessel:

| | |
|---|---|
| Chicken fat | 979 g |
| Sodium sulfide (25% w/w in water) | 20 g |

The cooking temperature was gradually increased to 200° C. over 70 minutes, held at 200° C. for 50 minutes, and gradually decreased to 50° C. over 60 minutes. One gram of "Phaulox-P" antioxidant was added, and the resulting mixture was added, at 2.5% by weight, to a standard chicken liver liquid digest.

Based on two-bowl tests using dogs, this chicken fat preparation improved the palatability of the standard liquid liver digest by at least 2×, compared to the same liver digest with no additives.

Example 4

Treatment of Saponified Poultry Fat with Sulfide

The following ingredients were mixed together and placed in a Parr vessel:

| | |
|---|---|
| Water | 489 g |
| Sodium Hydroxide | 60 g |
| Poultry fat | 400 g |
| Sodium sulfide (25% w/w in water) | 50 g |

The cooking temperature was gradually increased to 200° C. over 70 minutes, held at 200° C. for 50 minutes, and gradually decreased to 50° C. over 60 minutes. One gram of "Phaulox-P" antioxidant was added, and the resulting mixture was added, at 2.5% by weight, to a standard chicken liver liquid digest.

Based on two-bowl tests using dogs, this chicken fat preparation improved the palatability of the standard liquid liver digest by at least 2×, compared to the same liver digest with no additives.

Example 5

Treatment of Chicken Fat with Sulfide and Arginine

The following ingredients (including arginine, used as a nitrogen source) were mixed together and placed in a Parr vessel:

| | |
|---|---|
| Chicken fat | 968 g |
| Sodium sulfide (25% w/w in water) | 20 g |
| Arginine | 11 g |

The sodium sulfide and arginine were in roughly equal molar proportions. The chicken fat was in saturation.

The cooking temperature was gradually increased to 200° C. over 70 minutes, held at 200° C. for 50 minutes, and gradually decreased to 50° C. over 60 minutes. One gram of "Phaulox-P" antioxidant was added, and the resulting mixture was added, at 2.5% by weight, to a standard chicken liver liquid digest.

Based on two-bowl tests using dogs, this chicken fat preparation improved the palatability of the standard liquid liver digest by at least 2×, compared to the same liver digest with no additives.

Thus, there has been shown and described a new and useful means for treating animal or vegetable fats with sulfur and/or nitrogen donor compounds, to create improved flavor and palatability enhancers for animal foods. Although this invention has been exemplified for purposes of illustration and description by reference to certain specific embodiments, it will be apparent to those skilled in the art that various modifications, alterations, and equivalents of the illustrated examples are possible. Any such changes which derive directly from the teachings herein, and which do not depart from the spirit and scope of the invention, are deemed to be covered by this invention.

The invention claimed is:

1. A palatability enhancer for an animal food, comprising a cooked product created by a method comprising the steps of:
    (a) creating a liquefied mixture comprising triglyceride molecules derived from at least one plant or animal source, mixed with at least one donor which functions as a donor of elements selected from the group consisting of sulfur, nitrogen, and a combination of sulfur and nitrogen; and,
    (b) cooking the liquefied mixture under a suitable combination of temperature, pressure, and time conditions to cause: (i) breakage of a substantial quantity of the triglyceride molecules, thereby creating smaller molecular fragments; and (ii) chemical bonding of sulfur or nitrogen atoms to the smaller molecular fragments, in quantities sufficient to form a cooked product for use as a palatability enhancer for at least one type of animal food preparation; wherein cooking is performed at ambient pressure and a temperature of about 90° C. to about 98° C. for about 1 to about 6 hours, or cooking is performed at a pressure of greater than 10 pounds per square inch and a temperature of about 110° C. to about 200° C. for about 15 to about 60 minutes; and
    at least one second palatability enhancer ingredient prepared by hydrolytic fermentation of at least one type of cohesive animal tissue.

2. An animal food product, comprising a dry or semi-dry animal food prepared by a method selected from the group consisting of pelleting, extruding, or molding, and which has on at least some of its surfaces a palatability enhancer for an animal food created by a method comprising the steps of:
    (a) creating a liquefied mixture comprising triglyceride molecules derived from at least one plant or animal source, mixed with at least one donor which functions as a donor of elements selected from the group consisting of sulfur, nitrogen, and a combination of sulfur and nitrogen; and,
    (b) cooking the liquefied mixture under a suitable combination of temperature, pressure, and time conditions to cause: (i) breakage of a substantial quantity of the triglyceride molecules, thereby creating smaller molecular fragments; and (ii) chemical bonding of sulfur or nitrogen atoms to the smaller molecular fragments, in quantities sufficient to form a cooked product for use as a palatability enhancer for at least one type of animal food preparation, wherein cooking is performed at ambient pressure and a temperature of about 90° C. to about 98° C. for about 1 to about 6 hours, or cooking is performed at a pressure of greater than 10 pounds per square inch and a temperature of about 110° C. to about 200° C. for about 15 to about 60 minutes.

3. The palatability enhancer for an animal food of claim 1, wherein at least some of the triglyceride molecules are derived from a plant source selected from the group consisting of corn, olives, peanuts, safflower oil, palm oil, rapeseed oil, soybean oil, cottonseed oil, coconut oil, and canola oil.

4. The palatability enhancer for an animal food of claim 1, wherein at least some of the triglyceride molecules are derived from an animal source selected from the group consisting of beef fat, port fat, poultry fat, and fish oil.

5. The palatability enhancer for an animal food of claim 1, wherein the donor is a sulfide salt, a sulfide liquor, elemental sulfur, a manufacturing byproduct that contains at least about 1% sulfur by weight, a nucleotide, urea, other molecules containing amine groups, a molecule that contains amide groups, a molecule that contain guanidine groups, a heterocyclic compound that can release and donate nitrogen atoms under cooking conditions, or a chemical manufacturing byproduct that contain at least about 5% nitrogen by weight.

6. The palatability enhancer for an animal food of claim 5, wherein the donor is a sulfide salt, a sulfide liquor, elemental sulfur, a nucleotide, urea, other molecules containing amine groups, a molecule that contains amide groups, a molecule that contain guanidine groups, or a heterocyclic compound that can release and donate nitrogen atoms under cooking conditions.

7. The palatability enhancer for an animal food of claim 5, wherein the donor is a nucleotide, urea, other molecules containing amine groups, a molecule that contains amide groups, a molecule that contain guanidine groups, or a heterocyclic compound that can release and donate nitrogen atoms under cooking conditions.

8. The palatability enhancer for an animal food of claim 1, wherein cooking is performed for about 1 hour to about 6 hours.

9. The palatability enhancer for an animal food of claim 1, wherein cooking at a temperature of about 110° C. to about 200° C. is performed for about 15 to about 60 minutes.

10. The palatability enhancer for an animal food of claim 1, wherein the second palatability enhancer ingredient is a digest of chicken livers with hydrolytic enzymes.

11. The palatability enhancer for an animal food of claim 1, wherein the entire contents of the cooked product is used as an animal food flavorant.

12. The animal food product of claim 2, wherein the entire contents of the cooked product is used as an animal food flavorant.

13. A palatability enhancer for an animal food, comprising a cooked product created by a method comprising the steps of:
(a) creating a liquefied mixture comprising triglyceride molecules derived from at least one plant or animal source, mixed with at least one donor which functions as a donor of elements selected from the group consisting of sulfur, nitrogen, and a combination of sulfur and nitrogen; and
(b) cooking the liquefied mixture under a suitable combination of temperature, pressure, and time conditions to cause: (i) breakage of a substantial quantity of the triglyceride molecules, thereby creating smaller molecular fragments; and (ii) chemical bonding of sulfur or nitrogen atoms to the smaller molecular fragments, in quantities sufficient to form a cooked product for use as a palatability enhancer for at least one type of animal food preparation; wherein cooking is performed at ambient pressure and a temperature of about 90° C. to about 98° C. for about 1 to about 6 hours, or cooking is performed at a pressure of greater than 10 pounds per square inch and a temperature of about 110° C. to about 200° C. for about 15 to about 60 minutes.

* * * * *